(12) United States Patent
Lumley

(10) Patent No.: US 11,460,150 B2
(45) Date of Patent: Oct. 4, 2022

(54) MOUNTING DEVICE FOR AN EXPLOSIVE CHARGE

(71) Applicant: LINEAR SHAPED LIMITED, Hartlepool (GB)

(72) Inventor: Andrew Lumley, Alston (GB)

(73) Assignee: LINEAR SHAPED LIMITED, Hartlepool (GB)

(*) Notice: Subject to any disclaimer, the term of this patent is extended or adjusted under 35 U.S.C. 154(b) by 381 days.

(21) Appl. No.: 16/196,331

(22) Filed: Nov. 20, 2018

(65) Prior Publication Data

US 2019/0093820 A1    Mar. 28, 2019

Related U.S. Application Data

(63) Continuation of application No. PCT/GB2017/051404, filed on May 19, 2017.

(30) Foreign Application Priority Data

May 20, 2016 (GB) ..................................... 1608970
May 24, 2016 (GB) ..................................... 1609136

(51) Int. Cl.
| | |
|---|---|
| *F42D 3/00* | (2006.01) |
| *B32B 5/32* | (2006.01) |
| *F16M 13/02* | (2006.01) |
| *F42B 1/02* | (2006.01) |
| *F42D 1/02* | (2006.01) |

(52) U.S. Cl.
CPC ............... *F16M 13/02* (2013.01); *F42B 1/02* (2013.01); *F42D 1/02* (2013.01); *F42D 3/00* (2013.01); *B32B 5/32* (2013.01); *B32B 2307/546* (2013.01)

(58) Field of Classification Search
CPC .... F42B 1/02; F42B 1/028; F42B 3/08; F42D 3/00
See application file for complete search history.

(56) References Cited

U.S. PATENT DOCUMENTS 3,248,072 A * 4/1966 Schimmel ................. B64C 1/32
                                                        244/172.1
3,374,737 A * 3/1968 Pike ........................... F42B 1/02
                                                        102/275.5
(Continued)

FOREIGN PATENT DOCUMENTS

| CA | 2314808 A1 * | 5/2001 | |
| DE | 202015100290 U1 | 6/2016 | |
| WO | WO-2020263707 A1 * | 12/2020 | .............. F42B 1/028 |

OTHER PUBLICATIONS

International Search Report and Written Opinion dated Aug. 21, 2017 for related Intl Application PCT/GB2017/051404 filed May 19, 2017.

(Continued)

*Primary Examiner* — Gabriel J. Klein
(74) *Attorney, Agent, or Firm* — EIP US LLP

(57) ABSTRACT

Examples relate to a mounting device for an explosive charge, comprising a first layer comprising a first foam material, and a second layer comprising a second foam material. The first layer comprises a first surface for facing a target and a second surface adjoining the second layer. The second layer comprises a recess for receiving at least one of the explosive charges.

18 Claims, 4 Drawing Sheets

(56) References Cited

U.S. PATENT DOCUMENTS

| | | | | |
|---|---|---|---|---|
| 3,658,006 | A * | 4/1972 | Nistler | F42B 3/08 |
| | | | | 102/307 |
| 4,649,825 | A * | 3/1987 | Quick | F42B 15/38 |
| | | | | 102/307 |
| 4,856,430 | A * | 8/1989 | Gibb | F42B 3/08 |
| | | | | 102/307 |
| 6,220,166 | B1 * | 4/2001 | Cherry | F42B 33/06 |
| | | | | 102/305 |
| 6,672,217 | B1 * | 1/2004 | Tracy | F42B 12/44 |
| | | | | 102/358 |
| 6,817,297 | B1 * | 11/2004 | Greene | F42B 3/093 |
| | | | | 102/306 |
| 7,536,956 | B2 * | 5/2009 | Sammons | F42B 1/036 |
| | | | | 102/476 |
| 8,006,621 | B1 | 8/2011 | Cherry | |
| 10,495,431 | B2 * | 12/2019 | Barzilai | F42B 3/02 |
| 2004/0200342 | A1 * | 10/2004 | Sansolo | F42B 3/00 |
| | | | | 89/1.14 |
| 2010/0122639 | A1 | 5/2010 | Rickman et al. | |
| 2012/0145026 | A1 * | 6/2012 | Chastain | F42B 3/02 |
| | | | | 102/301 |
| 2013/0014661 | A1 * | 1/2013 | Lumley | F42B 1/032 |
| | | | | 102/307 |
| 2015/0192398 | A1 * | 7/2015 | Mitchell | F41H 11/00 |
| | | | | 33/562 |
| 2020/0191535 | A1 * | 6/2020 | Murray | F42B 3/093 |

OTHER PUBLICATIONS

Search Report dated Nov. 18, 2016 for related United Kingdom Application GB1608970.8 filed May 20, 2016.
Search Report dated Sep. 27, 2017 for related United Kingdom Application GB1609136.5 filed May 24, 2016.

* cited by examiner

MOUNTING DEVICE FOR AN EXPLOSIVE CHARGE

CROSS-REFERENCE TO RELATED APPLICATIONS

This application is a continuation under 35 U.S.C. § 120 International Application No. PCT/GB2017/051404, filed May 19, 2017, which claims priority to United Kingdom Application No. GB1608970.8 filed May 20, 2016 and United Kingdom Application No. GB1609136.5 filed May 24, 2016 under 35 U.S.C. § 119(a). Each of the above-referenced patent applications is incorporated by reference in its entirety.

BACKGROUND OF THE INVENTION

Field of the Invention

Explosive charges may be used to breach structures, for example constructional structures such as doors and walls, or metal structures such as a hull of a ship, a fuselage of an aircraft, or a structural support. It is often desirable to use contact charges or linear shaped charges to breach such structures. It is a difficult task to position explosive charges upon these structures securely and safely, such that the detonation of the explosive charge(s) and breaching of the structure is effective.

It is desirable to improve breaching of targets, for example such structures as described above, using an explosive charge.

DETAILED DESCRIPTION OF CERTAIN INVENTIVE EMBODIMENTS

Figure 1:
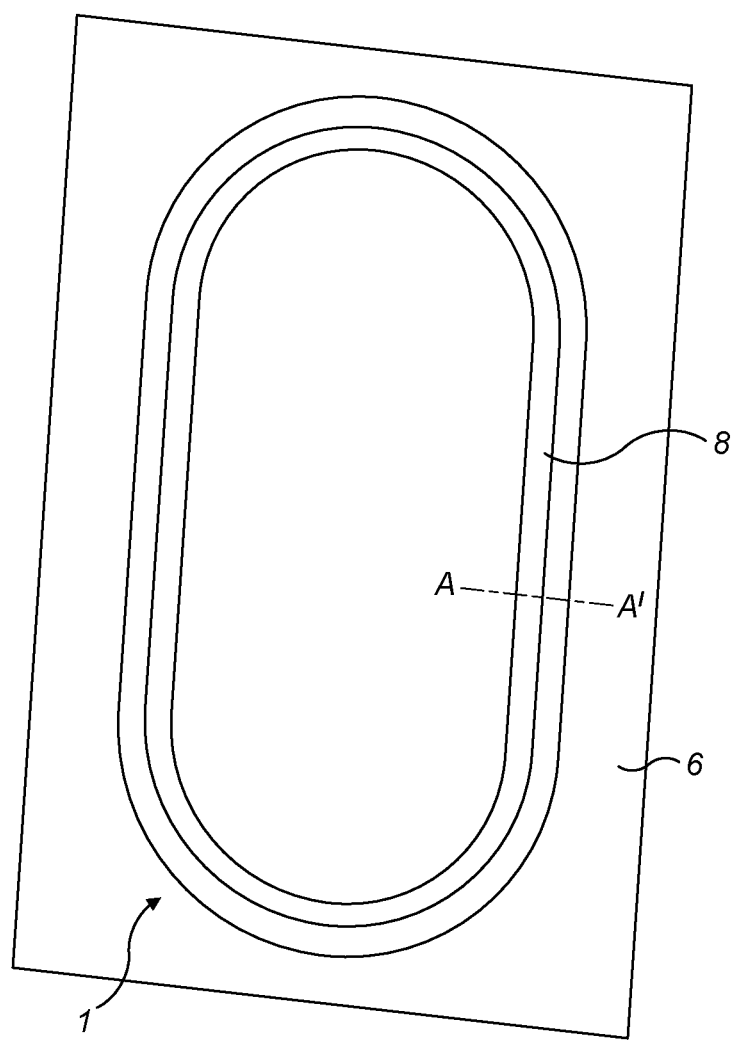
FIG. 1 shows schematically a mounting device for an explosive charge according to embodiments.

Explosive charges are often used for breaching structures, such as a wall, for people to pass through. When breaching such a structure, a device may be used for mounting an explosive charge ready for detonation. Use of such a device can reduce the amount of time required for mounting the explosive charge on or near the target for detonating, which time is called the "time on target". Particularly, in examples described below, the mounting device can be pre-configured with an explosive charge and detonation cord. Thus, to use, the mounting device merely is simply and quickly attached to a target surface (which may or may not require a prop), a detonator inserted in a detonation node, then the user withdraws and detonates the explosive charge. This reduces the "time on target" considerably.

In order for such a device to be practicable, it should be sturdy enough to be used in the intended use environment, and where carried by a person should be sufficiently light and compact to be transportable by a person. Such a device should also be reliable when used with explosive charges. For example, it should be easily mountable and adaptable to aid in the positioning of an explosive charge relative to a target for breaching, and in examples should preferably have minimal or no effect on the resultant energy release of the explosive charge upon the target when detonated.

It has been realised that a combination of two foam materials can be used to provide a mounting device for an explosive charge with any of the desired characteristics described above. For example, the two foam materials may be chosen with specific and complementary characteristics and combined to form a mounting device with a laminated foam structure comprising separate layers of the two foam materials. It has also been realised that in such a layered structure, a layer facing a target may allow conformability to the target such that a distance between the explosive charge and the target, or a surface of the target, is homogenised along a length of the explosive charge. The said distance may be the stand-off distance of a linear shaped charge in examples where the explosive charge is a linear shaped charge. The material of such a target-facing layer may be a foam material with properties that do not impede, and may even enhance, the energy shock or jet produced by the explosive charge. This may improve the performance of the explosive charge, for example the cutting of a jet produced by a linear shaped charge, and may therefore improve reliability of breaching.

Embodiments of a mounting device for an explosive charge will now be described, in which the mounting device comprises a first layer comprising a first foam material, and a second layer comprising a second foam material. In some examples, the first and/or second layer may be a single piece comprising, for example formed from, the respective first and/or second foam material. In other examples, either or each respective layer may be an assembly of component parts or pieces comprising, for example formed from, the respective first or second foam material. The shape of the layers may be elongate, for example rectangular, elliptical, "double-d", or obround shaped. An obround shape may be considered to be a shape consisting of two semicircles, or arcs, connected by parallel lines tangent to the endpoints of the two semicircles or arcs. The mounting device may, in some examples, be a single planar board or panel of the first foam material upon which a second planar board or panel of the second foam material adjoins, or is bonded to. The planar boards or panels may be elongate, for example rectangular, elliptical, "double-d", or obround shaped. The mounting device of such examples may be a unibody, for example a single moulded or shaped unit, which may be un-foldable. The mounting device may be, in some examples, an assembly of component pieces, or may have a first or second layer which is an assembly of component pieces, and which may be un-foldable. In other examples, the mounting device may be a foldable body formed of body parts, each comprising first and second layers, where the body parts can open and close, for example with a hinge. In the open configuration or state, the mounting device may resemble the unibody examples described above. The first layer comprises a first surface for facing a target and a second surface adjoining the second layer, the second layer comprising a recess for receiving at least one of the explosive charge.

Figure 2:
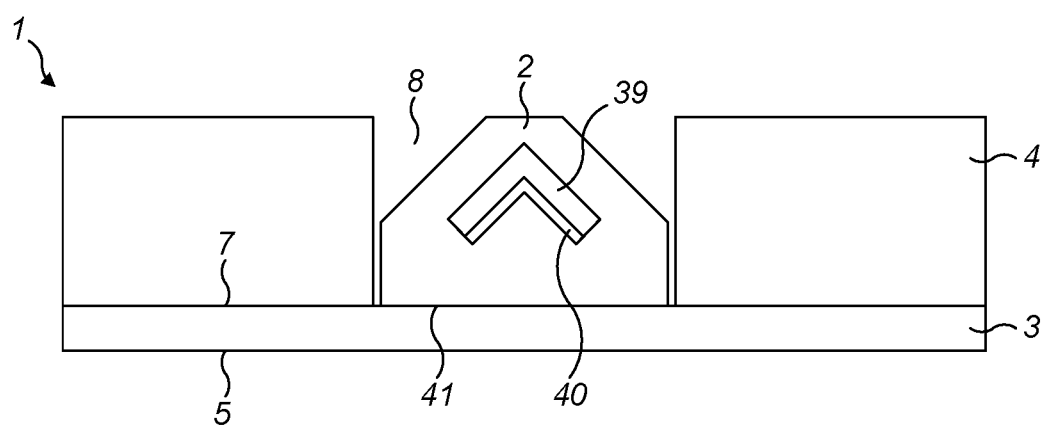
FIG. 2 shows schematically a cross-sectional view of a mounting device for an explosive charge according to embodiments.

FIGS. 1 and 2 show a mounting device 1 for an explosive charge 2. The mounting device 1 may be considered to be a frame, mounting frame, or other support structure for an explosive charge 2. The explosive charge 2 may be a linear shaped charge, as shown in FIG. 2, or a contact charge (which is for example a charge formed of explosive material placed directly on or close to a target surface, without any liner or shaped liner).

FIG. 2 shows the mounting device 1 in cross section, for example through the line AA', comprising a first layer 3, which comprises a first foam material, and a second layer 4, which comprises a second foam material. The first layer 3 comprises a first surface 5 for facing a target 6, and a second surface 7 adjoining the second layer 4. The second layer 4 comprises a recess 8 for receiving at least one of the explosive charge 2. In some embodiments, the mounting device comprises at least one explosive charge 2, located in the recess 8, as shown in FIG. 2. The explosive charge 2 may be a contact charge or a linear shaped charge. In some examples, the recess is shaped to receive different explosive loadings of explosive charge 2.

In some embodiments, the recess 8 is a channel. In other embodiments, the recess 8 may be a groove, indentation, trough, track, or elongate cavity. In some examples, the recess 8 may have a rectangular shape in cross-section, as shown in FIG. 2. In other examples, the recess 8 may have a square, semi-circular or parabolic shape in cross-section. The recess 8 may be open-ended on the user-facing side of the second layer 4, for example the side of the second layer 4 opposite the side adjoining the first layer 3. This may allow the mounting device 1 to be loaded with an explosive charge 2 from the user-side. In some examples, the recess 8 may therefore have a depth which is deep enough to support the explosive charge 2 for loading in the recess 8. Loading the mounting device 1 with the explosive charge 2 from the user-side can allow the user to see the explosive charge 2 received by the recess 8 of the second layer 4 when the mounting device 1 is applied to the target 6. This can improve the reliability of positioning the explosive charge 2 relative to the target 6 for breaching, as the user can see if the explosive charge 2 alters in position, for example by moving away from the target 6 or mounting device 1. In embodiments where the explosive charge 2 is a flexible linear shaped charge, the recess 8 may also determine a bend-radius of the linear shaped charge, for example the radius of curvature of a curved or bent portion of the linear shaped charge when received by the recess 8. This may allow the mounting device 1 to be designed for a particular linear shaped charge or range of linear shaped charges so as not to exceed the magnitude of its minimum-bend-radius in a portion where it is bent or curved. The minimum-bend-radius characteristic of a linear shaped charge (which may be considered the minimum radius of planar bending that a linear shaped charge can experience without sufficiently degrading performance of the cutting jet emitted by the charge upon detonation) may limit acute bending of a flexible linear shaped charge. Even linear shaped charges with geometries that resist performance degradation have a limit where over bending can degrade performance to a point where no cutting results at all.

In some embodiments, the first foam material may be less stiff than the second foam material. For example, the first foam material may have greater flexibility, pliability and/or elasticity than the second foam material. For example, the first foam material may be less 'stiff' than another foam material if it is easier to bend or flex, and likewise the second foam material may be more 'stiff' than another foam material if it is more difficult to bend or flex. Thus, the first foam material may be less stiff than the second foam material with the first foam material being easier to bend or flex than the second foam material. A property which may characterise the flexural properties of a foam material is flexural modulus, which indicates the force necessary to bend a sheet, or layer, of foam material to a particular degree. For example, the flexural modulus (or modulus of elasticity in flexure) of a foam material may be determined in accordance with the method described in British Standard BS4370, part 4, method 14 ("Determination of flexural properties"), published by the British Standards Institution. In some embodiments, the ratio of a flexural modulus value of the first foam material to a flexural modulus value of the second foam material is less than 13 percent. For example, in these embodiments, the first foam material may have a flexural modulus value in the range of 1.6 mega-pascals (MPa) to 2.4 mega-pascals (MPa), for example 2 MPa (or approximately 2 MPa within acceptable measuring or performance tolerances), measured in accordance with BS4370, part 4, method 14. In these embodiments, the second foam material may have a flexural modulus value in the range of 18.4 mega-pascals (MPa) to 27.6 mega-pascals (MPa), for example 23 MPa (or approximately 23 MPa within acceptable measuring or performance tolerances), measured in accordance with BS4370, part 4, method 14.

In some embodiments, the first foam material may be more deformable and/or conformable than the second foam material, and in some examples may therefore be conformable to a target surface (which may be a surface of the target 6). This may allow the interface between the explosive charge 2 and the target 6 to be more controllable, for example by the first layer 3 of first foam material regularising the surface of the target 6 by conforming to it and reducing the effect of surface features. For example, in embodiments where the explosive charge 2 comprises a linear shaped charge, as shown in FIG. 2, the first layer 3 of first foam material may homogenise, or improve the uniformity of, a stand-off distance of the linear shaped charge along its longitudinal axis. The stand-off distance of the linear shaped charge may be considered to be the distance between: the target 6 (or target surface); and the point of the liner of the linear shaped charge closest to the target 6 (or target surface). In some examples, the first layer 3 of first foam material may homogenise, or improve the uniformity of the distance between the face of the linear shaped charge and the target 6 (or target surface). This may in turn homogenise, or improve the uniformity of, a stand-off distance of the linear shaped charge along its longitudinal axis. This can improve the cutting performance of a jet produced by the linear shaped charge.

In some embodiments where the first foam material may be more deformable and/or conformable than the second foam material, the first foam material may be more elastic than the second foam material. In some examples, the first foam material may be compressed more easily than the second foam material. In some examples, the first foam material may have a compressive yield strength at 10 percent strain, for example 10 percent maximum strain, in the range of 0.08 MPa to 0.12 MPa, measured for example in accordance with International Standard ISO 7214:1998 published by the International Organisation for Standardization. In some examples, the second foam material may have a compressive yield strength at 10 percent strain, for example 10 percent maximum strain, measured for example in accordance with International Standard ISO 7214:1998, in the range of 0.56 MPa to 0.84 MPa. In some examples, the ratio of compressive yield strength at 10 percent strain, for example 10 percent maximum strain, of the first foam material to compressive yield strength at 10 percent strain, for example 10 percent maximum strain, of the second foam material is in the range of 9.5 percent to 21 percent.

In some embodiments, the first foam material may recover its original form, after being compressed, to a greater degree than the second foam material. For example, the ratio of the compression set, measured for example in accordance with ISO 7214:1998 at 25 percent strain and having a 24-hour recovery period, of the first foam material to the compression set of the second foam material, may be in the range of 23 percent to 35 percent. In some examples, the first foam material has a compression set, measured for example in accordance with ISO 7214:1998 at 25 percent strain and having a 24-hour recovery period, in the range of 1.8 to 2.2 percent, for example 2 percent. In some examples, the second foam material has a compression set, measured in accordance with ISO 7214:1998 at 25 percent strain and having a 24-hour recovery period, in the range of 6.3 to 7.7 percent, for example 7 percent.

In some examples, the first foam material has a tensile strength, measured for example in accordance with ISO 7214:1998, in the range of 0.56 MPa to 0.84 MPa, for example 0.70 MPa (or approximately 0.7 MPa within acceptable measuring or performance tolerances). In some examples, the second foam material has a tensile strength, measured for example in accordance with ISO 7214:1998, in the range of 1.92 MPa to 2.88 MPa, for example 2.40 MPa (or approximately 2.40 MPa within acceptable measuring or performance tolerances). In some examples, the ratio of tensile strength, measured for example in accordance with ISO 7214:1998, of the first foam material to the tensile strength of the second foam material is in the range of 19 percent to 44 percent.

In some examples, the first foam material has a tear strength, measured for example in accordance with British Standard, European Standard, and International Standard BS EN ISO 8067:1995, in the range of 1.36 to 2.04 kilonewtons per metre (kN/m), for example 1.7 kN/m (or approximately 1.7 kN/m within acceptable measuring or performance tolerances). In some examples, the second foam material has a tear strength, measured for example in accordance with BS EN ISO 8067:1995, in the range of 6.64 to 9.96 kilo-newtons per metre (kN/m), for example 8.3 kN/m (or approximately 8.3 kN/m within acceptable measuring or performance tolerances). In some examples, the ratio of tear strength, measured for example in accordance with BS EN ISO 8067:1995, of the first foam material to the tear strength of the second foam material is in the range of 14 percent to 30 percent.

In some embodiments, the first foam material may be less dense than the second foam material. For example, in some embodiments the first foam material may have a density of less than or equal to 60 kilograms per cubic metre (kg/m3), measured for example in accordance with ISO 7214:1998. In some examples, the first foam material may have a density in the range of 20 to 60, 30 to 60, 40 to 60, 50 to 60, or 55 to 60 kilograms per cubic metre (kg/m3), measured for example in accordance with ISO 7214:1998. In examples of these embodiments where the explosive charge 2 is a linear shaped charge, the first foam material having a density of less than or equal to 60 kg/m3 may allow for reduced attenuation of a jet produced by the linear shaped charge compared with foam materials having a density greater than 60 kg/m3, or with other non-foam materials. Such foam materials may in some examples allow shock waves, such as compaction or compression waves, from the explosive charge 2 to be transmitted with reduced or no attenuation, or even enhancement, following the lock-up and full compression of the foam material; in accordance with so-called "shock enhancement" theory, known to the person skilled in the art. In some examples of these embodiments, the first foam material may have a lower compressive yield strength than the second foam material, for example a compressive yield strength in the range of 0.08 MPa to 0.12 MPa, at 10 percent strain, measured for example in accordance with International Standard ISO 7214:1998, as previously described. This may allow for densification to at least partly occur, and thus, in some examples, enhancement of the compressive pulse from a contact charge due to the densification.

In some embodiments, the second foam material may have a density of less than or equal to 120 kg/m3, measured for example in accordance with ISO 7214:1998. Thus, in certain examples, the first foam material may have a density of less than or equal to 60 kg/m3 and the second foam material may have a density of less than or equal to 120 kg/m3, measured for example in accordance with ISO 7214:1998, while being more dense than the first foam material. In examples, the second foam material may have a density of less than or equal to 120 kg/m3 and greater than 80 kg/m3. In some examples, the second foam material has a density in the range of 80 to 120, 90 to 120, 100 to 120, 110 to 120, or 115 to 120 kilograms per cubic metre (kg/m3), measured for example in accordance with ISO 7214:1998. In some examples, the second foam material may have a density of at least 1.3, 1.4, or 1.5 times, for example 2 times, the density of the first foam material. The denser second foam material may provide structural integrity to the second layer 4 so that the received explosive charge 2 is sufficiently supported, and the mounting device 1 is sturdy for placement on the target 6. Combining the first and second foam materials as first and second layers, 3 and 4, to form what may be considered to be a composite laminate foam structure may therefore provide robustness of the mounting device 1 without impeding or attenuating a shock wave or jet formed by the explosive charge 2 on detonation.

In some embodiments, the first or second foam material comprises a polyethylene (PE) foam. In some embodiments the first foam material and the second foam material each comprise a polyethylene foam. Polyethylene foam provides chemical inertness for the mounting device, which may allow for both of the first and second layers of the mounting device to be non-reactive with explosives, for example an explosive charge 2 received by the second layer 4. Polyethylene foam, for example closed-cell polyethylene foam, may also provide moisture resistance, which may allow the mounting device to be used in practical situations involving exposure to water.

The first and second materials, each comprising PE foam, may be bonded by heat welding or by the use of an adhesive such as a poly(vinyl acetate) or resin glue.

Cells of the polyethylene foam of at least one of the first foam material or the second foam material may comprise nitrogen gas, for example molecular nitrogen $N_2$. In some embodiments, the cells of the first foam material may each have a cell-length of 0.3 to 0.6 mm. In some embodiments, the cells of the second foam material may each have a cell-length of 1.0 to 1.5 mm.

In some embodiments, the first foam material comprises foamed low-density polyethylene (LDPE). LDPE may be defined by a density range of 0.910-0.940 grams per cubic centimetre (g/cm3). In some embodiments, the second foam material comprises high-density polyethylene (HDPE). HDPE may be defined by a density of greater than, or equal to, 0.941 g/cm3. For example, in some embodiments, the first foam material may comprise LDPE (having a density between 0.910-0.940 g/cm3) foamed such that the first foam material has a density of less than or equal to 0.06 g/cm3 (60 kg/m3), measured for example in accordance with ISO 7214:1998. Likewise, in some embodiments, the second foam material may comprise HDPE (having a density greater than or equal to 0.941 g/cm3, for example 0.970 g/cm3) foamed such that the second foam material has a density of less than or equal to 0.12 g/cm3 (120 kg/m3), measured for example in accordance with ISO 7214:1998.

In other embodiments, the first layer 3 or second layer 4, or both layers, may comprise or be formed from, polyester foam, polyurethane foam, polyisocyanurate foam, or another foam with similar physical properties as previous examples of foam materials.

In some embodiments, the first layer 3 has a thickness with a value in the range of 5 millimetres (mm) to 25 millimetres (mm). More specific ranges may be selected in certain examples of these embodiments, for example dependent on the target and/or the explosive loading of the explosive charge that the mounting device is for. For example, for targets such as typical interior doors and walls made of materials like wood, plasterboard etc. the first layer 3 may have a thickness with a value in the range of 5 mm to 7 mm. In other examples, such as the target being an exterior wall made of materials like concrete, brick etc. the thickness of the first layer 3 may be greater than 7 mm.

In some embodiments, the second layer 4 may have a thickness of at least 50 mm. This thickness may allow for enough stiffness of the second layer to be structurally supportive of the explosive charge 2. In some examples, the second layer 4 may have a thickness of at least 60, 70, 75, 80, or 90 mm. Such a thickness is, in examples, sufficient to completely recess the explosive charge in the recess, without protruding therefrom. For example, a thickness of 50 mm may be required to recess the charge, with an additional 10, 20, 25, 30 or 40 mm thickness of second foam material to also recess for example an initiator inserted into the explosive charge. The thickness of the second foam material may determine the depth of the recess, which may be deeper than a height of an explosive charge loaded therein.

In some embodiments, the first layer may have a thickness with a range of 5 to 7 mm, for example 6 mm, and the second layer may have a thickness with a range of 75 to 105 mm, for example 90 mm.

The second layer in some examples may be formed as, or considered to function as, a structural support frame or skeleton onto which the first layer and the explosive charge(s) may be attached.

The first layer 3 and second layer 4 may be elongate, for example rectangular, elliptical, "double-d", or obround shaped.

Figure 3:
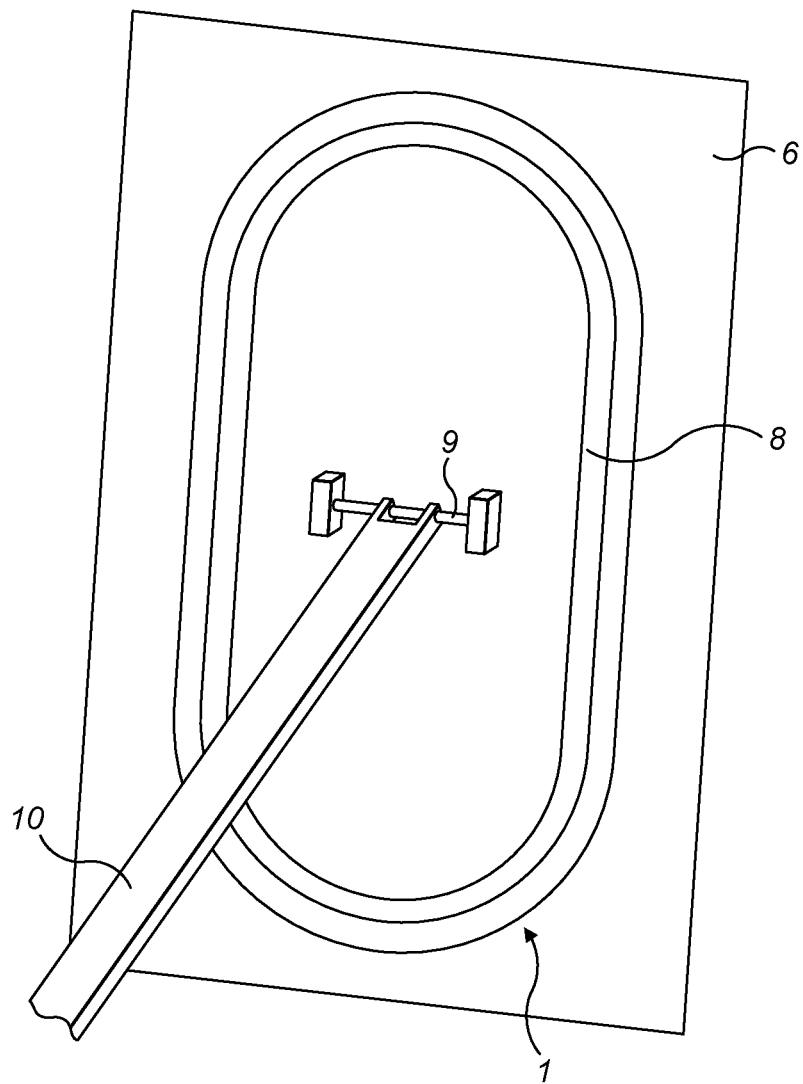
FIG. 3 shows schematically a mounting device for an explosive charge propped against a target according to embodiments.

In some embodiments, the mounting device 1 comprises a fitting 9 for connecting a prop 10, as shown in FIG. 3. In some embodiments, the mounting device 1 comprises the prop 10. The prop 10 may allow the mounting device 1 to be fixed in position upon the target 6. In some examples, the prop 10 may comprise one or more recesses. and the fitting 9 may comprise a bar on which the prop 10 may connect via a snap fit, with the bar slotting into the one or more recesses of the prop 10. FIG. 3 shows schematically the fitting 9 and prop 10; in some examples the length of the bar and the width of a connecting portion of the prop 10 for connecting to the bar may be substantially similar, for example 160 mm and 150 mm, respectively. The bar may comprise, or be formed of, the second foam material, for example polyethylene foam having a density of less than or equal to 120 kg/m3, measured for example in accordance with ISO 7214:1998. This may allow the bar to substantially disintegrate upon detonation of the explosive charge 2, and thus not be, or form, a harmful or lethal projectile. In these examples, the prop 10 and fitting 9 may be able to hinge such that the height of the mounting device 1 from a floor, upon which the prop 10 rests, may be adjusted. The angle at which the prop 10 rests with respect to the mounting device 1 may also be adjusted in these examples. In other examples, the angle of the prop 10 is standardised and fixed at 30 to 70 degrees, or 50 degrees. The length of the prop 10 may also be standardised and fixed, for example to be equal to the width of the mounting device 1. For example a mounting device 1 with a length of 1.4 metres (m) and width of 0.7 m, may be propped by a prop 10 with a length of 0.7 m at an angle of 50 degrees, such that the mounting device is held at a height of 0.3 m off the floor upon which the prop 10 rests. This height of 0.3 m is around average knee-height for a person, and so the mounting device and prop may be configured in such examples to breach a target 6 so as to leave a hole with a lower edge at 0.3 m off the ground which may be easier for a person to pass through.

The prop 10 may comprise or be formed of the second foam material, for example polyethylene foam having a density of less than or equal to 120 kg/m3, measured for example in accordance with ISO 7214:1998. This may allow the prop 10 to substantially disintegrate upon detonation of the explosive charge 2, and thus not be, or form, a harmful or lethal projectile.

As previously described, the mounting device may, in some embodiments, be a single body, or unibody, for example a single moulded or shaped unit, which may be unfoldable; but in other embodiments may be a foldable body formed of body parts. In these folding embodiments, the mounting device may have closed and open states. For example, the body parts may be planar boards or panels that, when abutting each other in an open state of the foldable mounting device, may form a complete body for application to a target. The unfolded, or complete body may in some examples be elongate, for example rectangular, elliptical, "double-d", or obround shaped. In other examples the unfolded or complete body may be circular, square or shaped like another regular polygon. The body parts may be shaped to correspond to half of the shape of the unfolded complete body. For example, the body parts may be square shaped to form a complete rectangular body when unfolded to abut each other.

Figure 4A:
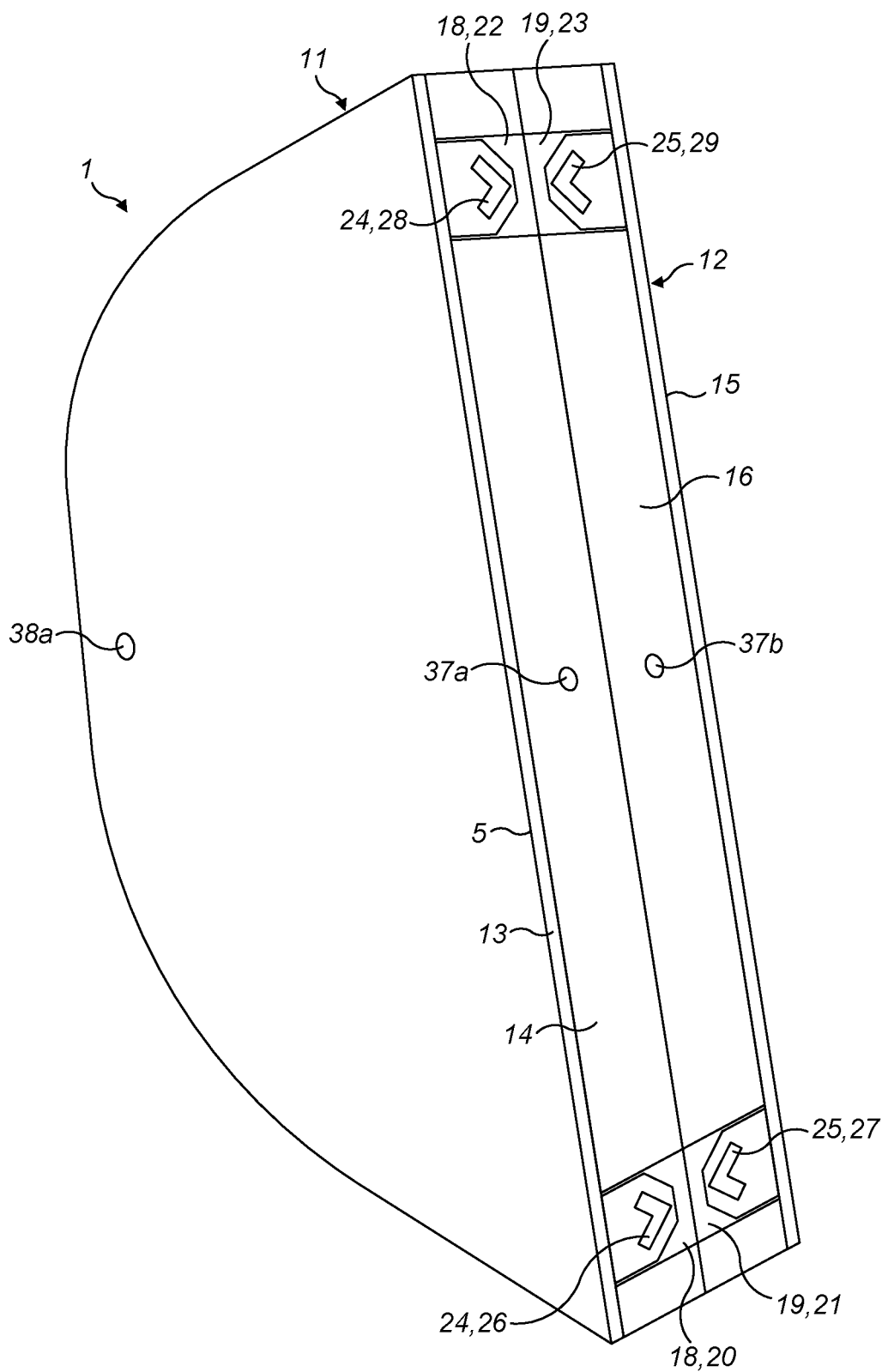
FIG. 4*a* shows schematically a mounting device for an explosive charge in a closed state according to embodiments.
Figure 4B:
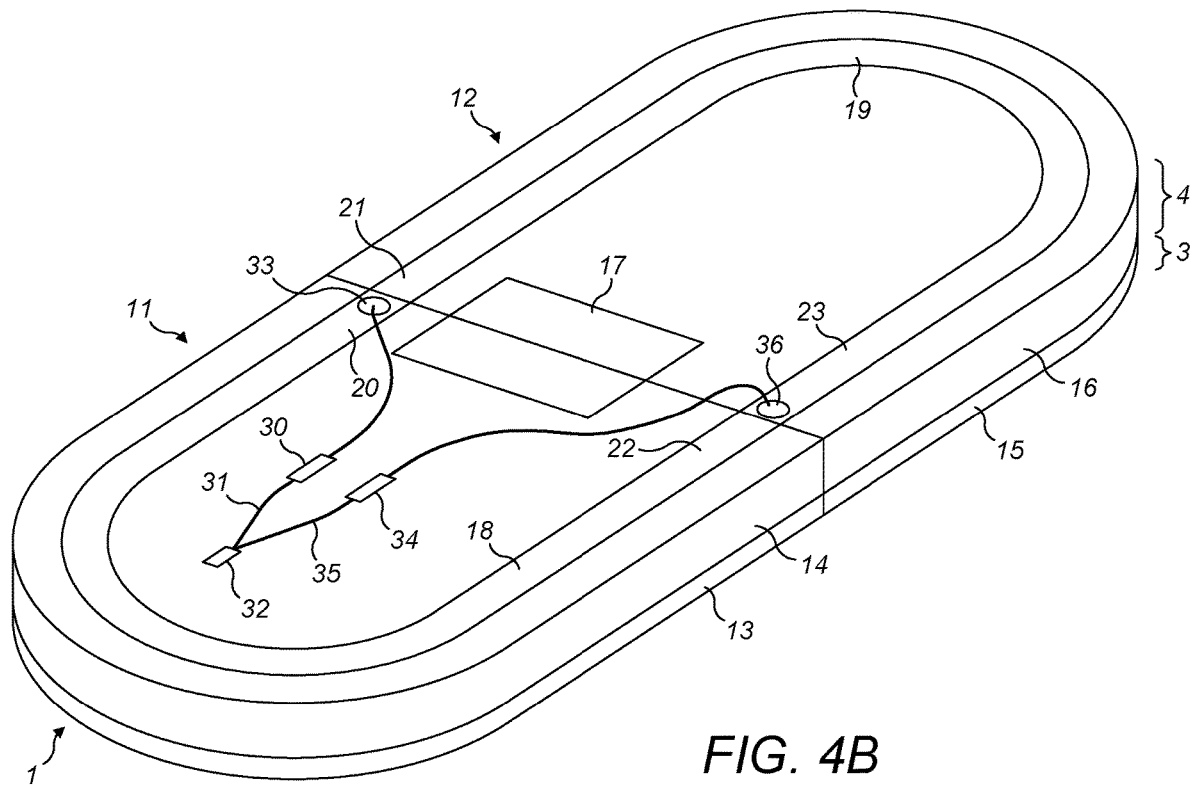
FIG. 4*b* shows schematically a mounting device for an explosive charge in an open state according to embodiments

In some embodiments, the mounting device 1 may comprise a first body part 11 and a second body part 12, as shown in FIGS. 4a and 4b. The first body part may comprise a first part 13 of the first layer 3 adjoining a first part 14 of the second layer 4. The second body part 12 may comprise a second part 15 of the first layer 3 adjoining a second part 16 of the second layer 4. In some embodiments, the first body part 11 may be connected with at least one hinge 17 to the second body part 12. In these embodiments, the mounting device 1 is hingeable between a closed state, as shown in FIG. 4a; and an open state, as shown in FIG. 4b. In the closed state, the first body part 11 may be at least overlapping the second body part 12. In the open state, the first part 13 of the first layer 3 may be adjacent to the second part 15 of the first layer 3, to form the first layer 3. The first part 14 of the second layer 4 may be adjacent to the second part 16 of the second layer 4, to form the second layer 4, in the open state also.

The mounting device 1 being hingeable, or foldable, between open and closed states may allow for it to be carried and transported more easily. For example, in embodiments where the first foam material has a density of less than or equal to 60 kg/m3, and the second foam material has a density of less than or equal to 120 kg/m3, and the height of the mounting device 1 is 1.4 m, the width of the mounting device is 0.7 m, the total mass of the mounting device 1, including the explosive charge 2 (of typical explosive loading for a mounting device of this size), is under 5 kg. Thus, the mounting device 1 is, in some examples, light enough for a single person to carry, for example in a closed state, and position to or on a target 6.

In some examples of the embodiments where the mounting device 1 is hingeable between a closed and open state, the first surface 5 faces outwards when the mounting device 1 is in the closed state. This is shown in FIG. 4a. This can allow any modifications to the second layer 4, such as connection features, recesses, or an attached hinge 17, for example, to be hidden in the folded closed state of the mounting device 1, such that the outer surface is neat and tidy, for example sufficiently smooth and/or uniform. This can mean that the mounting device 1 can be more easily transported and/or carried by a person. In some examples, the first and second parts, 14 and 16, of the second layer 4 may be moulded to receive corresponding features that interlock, interconnect, or otherwise engage with one another, for example a fitting for a prop.

In some embodiments, the at least one hinge 17 is a living hinge, for example, a living hinge formed from the second foam material and fused or bonded to the second layer 4 (or first and second parts, 14 and 16, of the second layer 4 in embodiments where the mounting device 1 is hingeable). The fusing or bonding may be by heat welding or by an adhesive such as a glue. Although other types of hinge with fasteners, such as screw hinges, riveted hinges or similar hinges comprising metallic parts could be used for the at least one hinge 17, the use of a living hinge as described may allow for no lethal fragmentation. For example, if the second foam material is chosen such that it substantially disintegrates when exposed to a detonated explosive charge 2, such as PE foam with a density of less than or equal to 120 kg/m3, measured for example in accordance with ISO 7214:1998, then a living hinge formed from this material will disintegrate and not produce fragments likely to be harmful or lethal after detonation, in contrast to metallic components such as rivets. Therefore, the mounting device 1 may comprise no metallic parts or components.

In some embodiments, the mounting device comprises a locking member which is configured to connect with the first and second body parts, 11 and 12 respectively, and lock the mounting device 1 in the open state. For example, the mounting device 1 may be locked such that the first part 13 of the first layer 3 and the second part 15 of the first layer 3 are adjacent to form the first layer 3, which may be coplanar and/or have a coplanar second surface 7. In some examples, the locking member may be a pin that can slot into holes 37a and 37b (both shown in FIG. 4a) in the first body part 11 and second body part 12, respectively, to lock the mounting device 1 in the open state. The locking pin may, in these examples form a friction lock or seal, where friction between the locking pin and an inside surface of the holes 37a and 37b may act to resist the first and second body parts 11 and 12 hinging and the mounting device 1 folding towards its closed state.

In some embodiments, the locking member may also be configured to connect with the first and second body parts, 11 and 12 respectively, and hold or lock the mounting device 1 in the closed state. In some examples where the locking member is a pin, the locking member may slot into holes 38a (shown in FIG. 4a) and 38b (not shown in FIG. 4a) in the first body part 11 and second body part 12, respectively, to lock the mounting device 1 in the closed state. The locking pin may, in these examples form a friction lock or seal, where friction between the locking pin and an inside surface of the holes 38a and 38b may act to resist the first and second body parts 11 and 12 hinging away from each other, and the mounting device 1 unfolding towards its open state.

In some embodiments, the locking member comprises the second foam material, for example polyethylene foam with a density of less than or equal to 120 kg/m3, measured for example in accordance with ISO 7214:1998. In other embodiments, the locking member may comprise polyester.

In some embodiments, no component of the mounting device may be denser than 1000 kg/m3, for example the density of water. In examples where the mounting device comprises the locking member, which may be the densest component or part, more than 99 percent by mass, or weight (99 wt %), of the mounting device may be no denser than 120 kg/m3, measured for example in accordance with ISO 7214:1998.

In some embodiments, the first part 14 of the second layer 4 comprises a first recess portion 18 of the recess 8. The second part 16 of the second layer 4 may comprise a second recess portion 19 of the recess 8. Each of the first recess portion 18 and the second recess portion 19 may respectively have a U-shape, or parabolic shape, as shown in FIG. 4b, with a first end and a second end. In some examples, with the mounting device 1 in the open state, the first end 20 of the first recess portion 18 abuts the first end 21 of the second recess portion 19 and the second end 22 of the first recess portion 18 abuts the second end 23 of the second recess portion 19. For example, the first end 20 of the first recess portion 18 and the first end 21 of the second recess portion 19 may be end-to-end, and the second end 22 of the first recess portion 18 and the second end 23 of the second recess portion 19 may be end-to-end.

In examples where the first recess portion 18 and the second recess portion 19 have a U-, or parabolic shape, the mounting device 1 in the open state may therefore have a complete obround-shaped recess 8 for receiving an explosive charge.

In some embodiments, the first recess portion 18 may comprise a first explosive charge 24, and the second recess portion 19 may comprise a second explosive charge 25. For example, the first explosive charge 24 may be placed on, or substantially secured with an adhesive to, a base of the first recess portion 18, and may rest against a side, or sides, of the first recess portion 18. Similarly, the second explosive charge 25 may be placed on, or substantially secured with an adhesive to, a base of the second recess portion 19, and may rest against a side, or sides, of the second recess portion 19.

In some examples of these embodiments, with the mounting device 1 in to the open state, a first end 26 of the first explosive charge abuts a first end 27 of the second explosive charge 25, and a second end 28 of the first explosive charge 24 abuts a second end 29 of the second explosive charge 25. For example, the first end 26 of the first explosive charge and the first end 27 of the second explosive charge 25 may be end-to-end, and the second end 28 of the first explosive charge 24 and the second end 29 of the second explosive charge 25 may be end-to-end.

In some embodiments, the mounting device 1 may comprise a first slot 30 and a second slot 34 for receiving detonation cord. For example, the first slot 30 may be for receiving a first detonation cord 31 extending from a detonation node 32 to a first initiation location 33 at the first recess portion 18 of the recess 8. The second slot 34 may be for receiving a second detonation cord 35 extending from the detonation node 32 to a second initiation location 36 at the second recess portion 19. In some examples, the first initiation location 33 may be located at the first end 20 of the first recess portion 18, and the second initiation location 36 may be located at the second end 23 of the second recess portion 19. This may allow for a more reliable breaching by the first explosive charge 24 and second explosive charge 25. For example, if the first explosive charge 24 and second explosive charge 25 are linear shaped charges, the described initiation locations may allow for a more reliable cutting by the jets produced by the linear shaped charges, 24 and 25, upon detonation at the detonation node 32, as the join or gap between the first and second body parts, 11 and 12, may be bridged or crossed twice by the jet of each linear shaped charge, 24 and 25. For example, the first bridging of a jet may occur at the end of the recess portion nearest the respective initiation location, for example the first end 20 of the first recess portion 18, and the second bridging of the same jet may occur at the end of the recess portion farthest from the respective initiation location, for example the second end 22 of the first recess portion 18.

The first initiation location 33 may, in some examples, be a cut-out or slot in the second layer 4, or first part of the second layer 14, for receiving an initiator or initiator holder for the first explosive charge 24. The second initiation location 36 may, in some examples, be a cut-out or slot in the second layer 4, or second part of the second layer 16, for receiving an initiator or initiator holder for the first explosive charge 25. An initiator holder may be a device or implement, for example made of a plastics material, for holding an initiator for initiating an explosive charge, for example a contact charge or linear shaped charge. As previously described, the recess 8, or first and second recess portions 18 and 19, may support an explosive charge 2. In some examples, a variety of explosive loadings of explosive charge 2 may be supported, for example a variety of linear shaped charge loadings may be supported, each with a different width. The cut-out or slot of the first initiation location 33, and/or second initiation location 36, may therefore allow an initiation holder to move within the cut-out or slot, such that the initiation holder may be centrally positioned above the explosive charge 2, for example a linear shaped charge. In some examples, the cut-out or slot may allow the initiation holder to move or track across the width of the channel and be held securely upright.

The detonation node 32 may be a member having a recess or cavity for receiving a detonator for initiating detonation cord. For example, the first detonation cord 31 and second detonation cord 35 may each be connected to the detonation node 32 such that upon initiation of a detonator placed into the detonation node 32, the first and second detonation cords 31 and 35 are initiated substantially simultaneously. The detonation node 32 may be, in some examples, received by, or in other examples formed as, part of the second layer 4, or one of the first or second parts, 14 or 16, of the second layer 4. The closed state of the mounting device 1 may therefore, in some embodiments, allow all of the required components for detonating an explosive charge, except for the detonator, to be present and folded up. When a target is then selected for breaching, the mounting device 1 can be easily unfolded to its open state, mounted onto the target 6, and possibly propped up by the prop 10 and locked by the locking member. All that is then required for detonation of the explosive charges, and breach of the target, is for the detonator to be inserted into the detonation node 32 and initiated. This helps to minimise the "time on the target".

In some embodiments, the mounting device 1 may be configured for attachment to a target object, for example with adhesive. In some examples, the mounting device 1 may comprise an adhesive or hydrogel in discrete locations in the plane of the first surface 5 of the first layer 3. The discrete locations may be located to not lie between the explosive charge 2 and the target 6, so as not to impede the shock or energy wave of the explosive charge 2 when detonated. For example, where the explosive charge 2 is a linear shaped charge, the discrete locations may be located to not lie in the path of a jet of the linear shaped charge when it is detonated, so as not to impede, or attenuate, the jet. The thickness of the adhesive or hydrogel may also be configured such that the adhesive or hydrogel has a negligible effect on, for example, the distance between the explosive charge 2 and the target 6, or the stand-off distance where the explosive charge 2 is a linear shaped charge. For example, in some embodiments where hydrogel is used to configure the mounting device 1 for attachment to the target 6, the thickness of hydrogel is 0.2 mm. Hydrogel may also be compressible so as to leave no sufficient air gap which could impede the jet of a linear shaped charge, or compression wave of a contact charge.

In some embodiments described above, linear shaped charges were referred to, for example as being an example of an explosive charge 2. A linear shaped charge, for example that of FIG. 2, may comprise an explosive element (e.g. 39), a liner (e.g. 40), and in some examples a face (e.g. 41) for application to a target object, with the liner arranged for projection towards the face when the explosive element is detonated. For example, as will be readily appreciated by the skilled person, a liner may be before detonation a longitudinal element having a V-shaped cross section and formed for example of copper or a material comprising copper or another suitable metal. The apex of the V-shape is located further from the target object than the two sides of the V-shape.

In some embodiments, the liner may be a metallic layer which extends away from a side of the charge to be applied to a target object, to surround, when viewed in cross-section, the explosive material of the linear shaped charge. Such a liner may have a V-shaped cross section.

Linear shaped charges may comprise a space between the liner and the face, the liner being arranged for projection through the space after the explosive element (located on a side of the liner furthest from the target object) is detonated. At least part of the space may be filled with a filling material. Linear shaped charges may also comprise a casing surrounding at least part of the explosive element. The casing and/or filling material may comprise foam, for example low density polyethylene (LDPE) foam. The casing and the filling material may be integrally formed. A linear shaped charge may be flexible along a longitudinal axis. This allows the target object to be cut with a curved shape when the linear shaped charge is detonated. In examples, flexible typically means that the linear shaped charge may be bent, twisted, or otherwise deformed, for example along or relative to a longitudinal axis of the linear shaped charge, for example by a human with their hands without any tools. A linear shaped charge may have elastic properties, so that the linear shaped charge at least partly returns to a pre-deformed configuration. In other embodiments, the linear shaped charge may have plastic properties, so that for example the linear shaped charge at least partly retains a deformed configuration after being deformed. In some embodiments, a linear shaped charge may be similar to a linear shaped charge described above, but which is substantially non-flexible, and therefore not for example deformable by a human with their hands without any tools. Such examples may include a linear shaped charge with a rigid copper or other metal liner.

In embodiments above, a thickness measurement is used. In respect of a thickness of a layer, the thickness may be taken to be the distance between two substantially parallel surfaces or planes, measured perpendicularly to the two substantially parallel surfaces or planes.

In embodiments described herein, it is envisaged that the recess may penetrate through the second layer, for example along a length of the recess, and with for example the thickness of the second layer being equal to a depth of the recess. Hence, a base of the recess may be considered as a portion of the first layer, for example a portion of a surface of the first layer. Thus, an explosive charge (such as a linear shaped charge) placed in the recess can be placed on the first layer, without any part of the second layer (and therefore the second foam material) lying between the explosive charge and the first layer. In this way, the second foam material does not for example impede a jet from the linear shaped charge when detonated. In some examples, an adhesive may be used to adhere the explosive charge to the first layer. The adhesive may be selected so as not to impede the jet.

In embodiments where the mounting device has open and closed states, with the recess comprising recess portions such as the first and second recess portions, each recess portion may be shaped such that each recess portion penetrates through the respective part of the second layer, such as the first and second parts. Hence, with the mounting device in the open state, the recess is formed from the recess portions as a recess penetrating through the second layer.

In embodiments described above, the first layer may be a planar board or panel, and/or the second layer may be a planar board or panel. Such a planar board or panel in some examples may be a continuous layer of the appropriate foam material. In some embodiments the second layer as mentioned above may be formed as, or function as, a structural support frame or skeleton. It is to be appreciated that in some embodiments therefore the second layer may not be a single continuous layer of the second foam material. Instead, the second foam material may generally form a layer but with at least one part of the layer removed, formed or shaped to create one or more voids, hollows, cut-outs or other openings in the second layer, which are different from the recess shaped to receive the explosive charge. The voids, hollows, cut-outs or other openings help for example to decrease weight of the mounting device, whilst maintaining the structural support function of the second layer. With such voids, hollows, cut-outs or other openings, the second layer of the second foam material may at least in part form ribs, struts or other structural support elements or members, which together give the second layer its structural supporting function. Such voids, hollows, cut-outs or other openings may in some examples pass through the full thickness of the second layer, but in other examples may pass only partly through a thickness of the second layer.

In some embodiments, the first layer may not be a single continuous layer of the first foam material, and may therefore be a layer of the first foam material with one or more voids, hollows, cut-outs or other openings therein, without detracting from for example the function of improving conformation to the target surface to improve stand-off distance for the explosive charge. Similarly, such voids, hollows, cut-outs or other openings may or may not pass through the full thickness of the first layer.

Further, the first layer and/or the second layer may each respectively be formed from a respective single piece of foam material, or in other examples may respectively be formed from component parts or pieces of foam which are assembled together to form the respective first or second layer.

A foam material is referred to in embodiments described herein. A foam material is for example a material comprising voids or cells divided from each other by dividing parts or walls such as inter-cell walls which may for example be a solid material such as a polymer. Such a foam material may be an open or closed cell foam, depending on whether cells or voids are fully enclosed by the dividing parts or walls, or not. Within the voids or cells, there may be gas such as nitrogen.

Further examples are envisaged within the scope of the numbered clauses below.

It is to be understood that any feature described in relation to any one embodiment may be used alone, or in combination with other features described and may also be used in combination with one or more features of any other of the embodiments, or any combination of any other of the embodiments. Furthermore, equivalents and modifications not described above may also be employed without departing from the scope of the accompanying claims.

Clauses

1. A mounting device for an explosive charge, comprising:
a first layer comprising a first foam material; and
a second layer comprising a second foam material,
wherein the first layer comprises a first surface for facing a target and a second surface adjoining the second layer, the second layer comprising a recess for receiving at least one of the explosive charge.

2. A mounting device according to clause 1, wherein the ratio of a flexural modulus value of the first foam material to a flexural modulus value of the second foam material is less than 13 percent.

3. A mounting device according to clause 1 or 2, wherein the first foam material is less dense than the second foam material.

4. A mounting device according to any preceding clause, wherein the first foam material is more deformable than the second foam material such that the first layer comprising a first foam material is conformable to a target surface.

5. A mounting device according to any preceding clause, wherein the first foam material has a density in the range of 30 to 60 $kg/m^3$.

6. A mounting device according to any preceding clause, wherein the second foam material has a density in the range of 80 to 120 $kg/m^3$.

7. A mounting device according to any preceding clause, wherein the first foam material and the second foam material each comprise a polyethylene foam.

8. A mounting device according to clause 7, wherein cells of the polyethylene foam of at least one of the first foam material or the second foam material comprise nitrogen gas.

9. A mounting device according to any preceding clause, wherein the first layer has a thickness in the range of 5 mm to 25 mm and the second layer has a thickness in the range of 80 to 120 mm.

10. A mounting device according to any preceding clause, comprising at least one of the explosive charge located within the recess.

11. A mounting device according to any preceding clause, wherein the explosive charge is a linear shaped charge or a contact charge.

12. A mounting device according to any preceding clause comprising a fitting for connecting a prop.

13. A mounting device according to clause 13, comprising the prop, the prop comprising the second foam material.

14. A mounting device according to any preceding clause, comprising:
  a first body part comprising:
    a first part of the first layer adjoining a first part of the second layer; and
  a second body part comprising:
    a second part of the first layer adjoining a second part of the second layer,
  the first body part connected with at least one hinge to the second body part,
  wherein the mounting device is hingeable between:
    a closed state with the first body part at least partly overlapping the second body part; and
    an open state with the first part of the first layer adjacent the second part of the first layer, to form the first layer, and with the first part of the second layer adjacent the second part of the second layer to form the second layer.

15. A mounting device according to clause 14, wherein with the mounting device in the closed state, the first surface faces outwards.

16. A mounting device according to clause 14 or 15, wherein the first part of the second layer comprises a first recess portion of the recess and the second part of the second layer comprises a second recess portion of the recess, each of the first recess portion and the second recess portion respectively having a U-shape with a first end and a second end, wherein with the mounting device in the open state the first end of the first recess portion abuts the first end of the second recess portion and the second end of the first recess portion abuts the second end of the second recess portion.

17. A mounting device according to clause 16, the first recess portion comprising a first explosive charge and the second recess portion comprising a second explosive charge, wherein with the mounting device in the open state a first end of the first explosive charge abuts a first end of the second explosive charge and a second end of the first explosive charge abuts a second end of the second explosive charge.

18. A mounting device according to clause 17, comprising:
  a first slot for receiving a first detonation cord extending from a detonation node to a first initiation location at the first recess portion; and
  a second slot for receiving a second detonation cord extending from the detonation node to a second initiation location at the second recess portion.

19. A mounting device according to clause 18, the first initiation location located at the first end of the first recess portion and the second initiation location located at the second end of the second recess portion.

20. A mounting device according to any of clauses 14 to 19, wherein each of the at least one hinge is a living hinge.

21. A mounting device according to any of clauses 14 to 20 comprising a locking member, wherein the locking member is configured to connect with the first and second body parts to lock the mounting device in the open state.

22. A mounting device according to any of clauses 14 to 21 comprising a locking member, wherein the locking member is configured to connect with the first and second body parts to lock the mounting device in the closed state.

23. A mounting device according to any preceding clause, wherein the recess is a channel.

24. A mounting device according to any preceding clause, wherein a base of the recess is a portion of the first layer.

25. A mounting device according to any preceding clause, wherein the first foam material has a flexural modulus value in the range of 1.6 to 2.4 mega-pascals (MPa).

26. A mounting device according to any preceding clause, wherein the second foam material has a flexural modulus value in the range of 18.4 to 27.6 mega-pascals (MPa).

27. A mounting device according to any preceding clause, wherein at least one of the first layer or the second layer is an assembly of component parts respectively comprising the first foam material or the second foam material.

28. A mounting device according to any preceding clause, wherein at least one of the first layer or the second layer comprises a void, hollow, cut-out or opening.

29. A mounting device according to any preceding clause, wherein the second layer comprises at least one rib, strut, structural support element or structural support member for structurally supporting the mounting device.

30. A mounting device according to any preceding clause, wherein the first foam material is configured to at least partially densify and lock-up upon detonation of the explosive charge, for enhancing conveyance of energy from the explosive charge to the target.

31. Apparatus substantially as hereinbefore described in the description and/or shown in the drawings.

What is claimed is:

1. A mounting device for a linear shaped charge, comprising:
  a first layer comprising a first foam material, the first layer comprising a first surface for facing a target and a second surface;
  a second layer comprising a second foam material at least one of adjoining or bonded to the second surface of the first layer, the second layer comprising a recess comprising a first recess portion and a second recess portion each having a U-shape to receive a respective linear shaped charge comprising an explosive element, a liner and a first longitudinal planar surface, a first part of the second layer comprising the first recess portion and a second part of the second layer comprising the second recess portion of the recess;
  a second longitudinal planar surface, within the first recess portion and the second recess portion respectively, for attachment to the first longitudinal planar surface of the respective linear shaped charge such that the respective linear shaped charge is oriented to emit, upon detonation of the respective linear shaped charge, a jet towards the first surface of the first layer; and
  wherein the first part of the second layer comprises:
    a detonation node,
    a first slot, the first slot for receiving a first detonation cord extending from the detonation node to a first initiation location at a first end of the first recess portion; and
    a second slot, the second slot for receiving a second detonation cord extending from the detonation node to a second initiation location at a second end of the second recess portion.

2. The mounting device according to claim 1, wherein the ratio of a flexural modulus value of the first foam material to a flexural modulus value of the second foam material is less than 13 percent.

3. The mounting device according to claim 1, wherein the first foam material is at least one of:
  less dense than the second foam material;
  more deformable than the second foam material such that the first layer comprising the first foam material is conformable to a target surface;
  has a density in the range of 30 to 60 kg/m³; or
  configured to at least partially densify and lock-up upon detonation of the explosive charge, for enhancing conveyance of energy from the explosive charge to the target.

4. The mounting device according to claim 1, wherein the second foam material has a density in the range of 80 to 120 kg/m³.

5. The mounting device according to claim 1, wherein the first foam material and the second foam material each comprise a polyethylene foam, or wherein the first foam material and the second foam material each comprise a polyethylene foam and wherein cells of the polyethylene foam of at least one of the first foam material or the second foam material comprise nitrogen gas.

6. The mounting device according to claim 1, wherein the first layer has a thickness in the range of 5 mm to 25 mm and the second layer has a thickness in the range of 80 to 120 mm.

7. The mounting device according to claim 1, comprising the respective linear shaped charge located respectively within the first recess portion and the second recess portion with the first longitudinal planar surface attached to the second longitudinal planar surface.

8. The mounting device according to claim 1 comprising a fitting for connecting a prop, or comprising a fitting for connecting a prop and comprising the prop, the prop comprising the second foam material.

9. The mounting device according to claim 1, comprising:
  a first body part comprising a first part of the first layer at least one of adjoining or bonded to the first part of the second layer; and
  a second body part comprising a second part of the first layer at least one of adjoining or bonded to the second part of the second layer;
  the first body part connected with at least one hinge to the second body part,
  wherein the mounting device is hingeable between:
    a closed state with the first body part at least partly overlapping the second body part; and
    an open state with the first part of the first layer adjacent the second part of the first layer, to form the first layer, and with the first part of the second layer adjacent the second part of the second layer to form the second layer.

10. The mounting device according to claim 9, wherein with the mounting device in the closed state, the first surface faces outwards.

11. The mounting device according to claim 9, wherein with the mounting device in the open state the first end of the first recess portion abuts a first end of the second recess portion and a second end of the first recess portion abuts the second end of the second recess portion.

12. The mounting device according to claim 11, the first recess portion comprising a first linear shaped charge and the second recess portion comprising a second linear shaped charge, wherein with the mounting device in the open state a first end of the first linear shaped charge abuts a first end of the second linear shaped charge and a second end of the first linear shaped charge abuts a second end of the second linear shaped charge.

13. The mounting device according to claim 9, wherein at least one of:
  each of the at least one hinge is a living hinge; or
  the mounting device comprises a locking member, wherein the locking member is configured to connect with the first and second body parts to lock the mounting device in at least one of the open state or the closed state.

14. The mounting device according to claim 1, wherein at least one of:
  the recess is a channel; or
  a base of the recess is a portion of the first layer.

15. The mounting device according to claim 1, wherein at least one of:
  the first foam material has a flexural modulus value in the range of 1.6 to 2.4 mega-pascals (MPa); or
  the second foam material has a flexural modulus value in the range of 18.4 to 27.6 mega-pascals (MPa).

16. The mounting device according to claim 1, wherein at least one of the first layer or the second layer is at least one of:
  an assembly of component parts respectively comprising the first foam material or the second foam material; or
  comprises a void, hollow, cut-out or opening.

17. The mounting device according to claim 1, wherein the second layer comprises at least one rib, strut, structural support element or structural support member for structurally supporting the mounting device.

18. The mounting device according to claim 1, wherein with the first longitudinal planar surface of the respective linear shaped charge attached to the second longitudinal planar surface, and before detonation of the respective linear shaped charge, the respective linear shaped charge can be seen, through the second layer, within the recess.

* * * * *